United States Patent
Mercier et al.

(10) Patent No.: US 6,612,224 B2
(45) Date of Patent: Sep. 2, 2003

(54) METHOD AND APPARATUS FOR THE PREPARATION OF HOT BEVERAGES

(75) Inventors: Pierre Mercier, Quebec (CA); Viet Pham, Quebec (CA); Marc-Antoine Archambault, Montreal (CA)

(73) Assignee: Les Thes Du Monde Enr., Verdun (CA)

( * ) Notice: Subject to any disclaimer, the term of this patent is extended or adjusted under 35 U.S.C. 154(b) by 0 days.

(21) Appl. No.: 10/072,978

(22) Filed: Feb. 12, 2002

(65) Prior Publication Data

US 2002/0121197 A1 Sep. 5, 2002

(30) Foreign Application Priority Data

Feb. 12, 2001 (CA) ............................................. 2335420

(51) Int. Cl.⁷ ............................. A47J 31/00; A23L 1/20
(52) U.S. Cl. ........................... 99/282; 99/299; 99/305; 99/288; 426/433
(58) Field of Search .......................... 99/281, 282, 283, 99/280, 300, 299, 305, 288; 426/433

(56) References Cited

U.S. PATENT DOCUMENTS

| 4,744,291 A | * | 5/1988 | Wallin .......................... 99/280 |
| 4,825,758 A | | 5/1989 | Snowball et al. ............. 99/282 |
| 4,888,466 A | | 12/1989 | Hoffmann ..................... 99/307 |
| 5,094,153 A | * | 3/1992 | Helbling ....................... 99/280 |
| 5,188,019 A | | 2/1993 | Vahabpour .................... 99/285 |
| 5,647,055 A | * | 7/1997 | Knepler ..................... 99/280 X |
| 5,858,437 A | * | 1/1999 | Anson ....................... 99/282 X |
| 5,901,635 A | | 5/1999 | Lucas et al. .................. 99/283 |

FOREIGN PATENT DOCUMENTS

| JP | 06022853 | 2/1994 |
| JP | 10328031 | 12/1998 |
| JP | 11197023 | 7/1999 |
| JP | 11332749 | 12/1999 |

* cited by examiner

Primary Examiner—Reginald L. Alexander
(74) Attorney, Agent, or Firm—Birch, Stewart, Kolasch & Birch, LLP

(57) ABSTRACT

A method and apparatus for producing a quantity of a hot beverage, comprising providing a source of a liquid having an adjustable temperature, selecting an infusion time and an infusion temperature, supplying from the source liquid substantially at the selected infusion temperature, the supplied liquid having a volume equal to or slightly larger than the quantity, mixing the supplied liquid with a flavor ingredient having the selected infusion time and infusion temperature, infusing the flavor ingredient in the supplied liquid substantially for the selected infusion time whereby the selected ingredient is at least partially dissipated in the supplied liquid thereby forming a brew, and following the infusion time, removing an undissipated portion of the flavor ingredient from the brew thereby yielding the beverage.

23 Claims, 7 Drawing Sheets

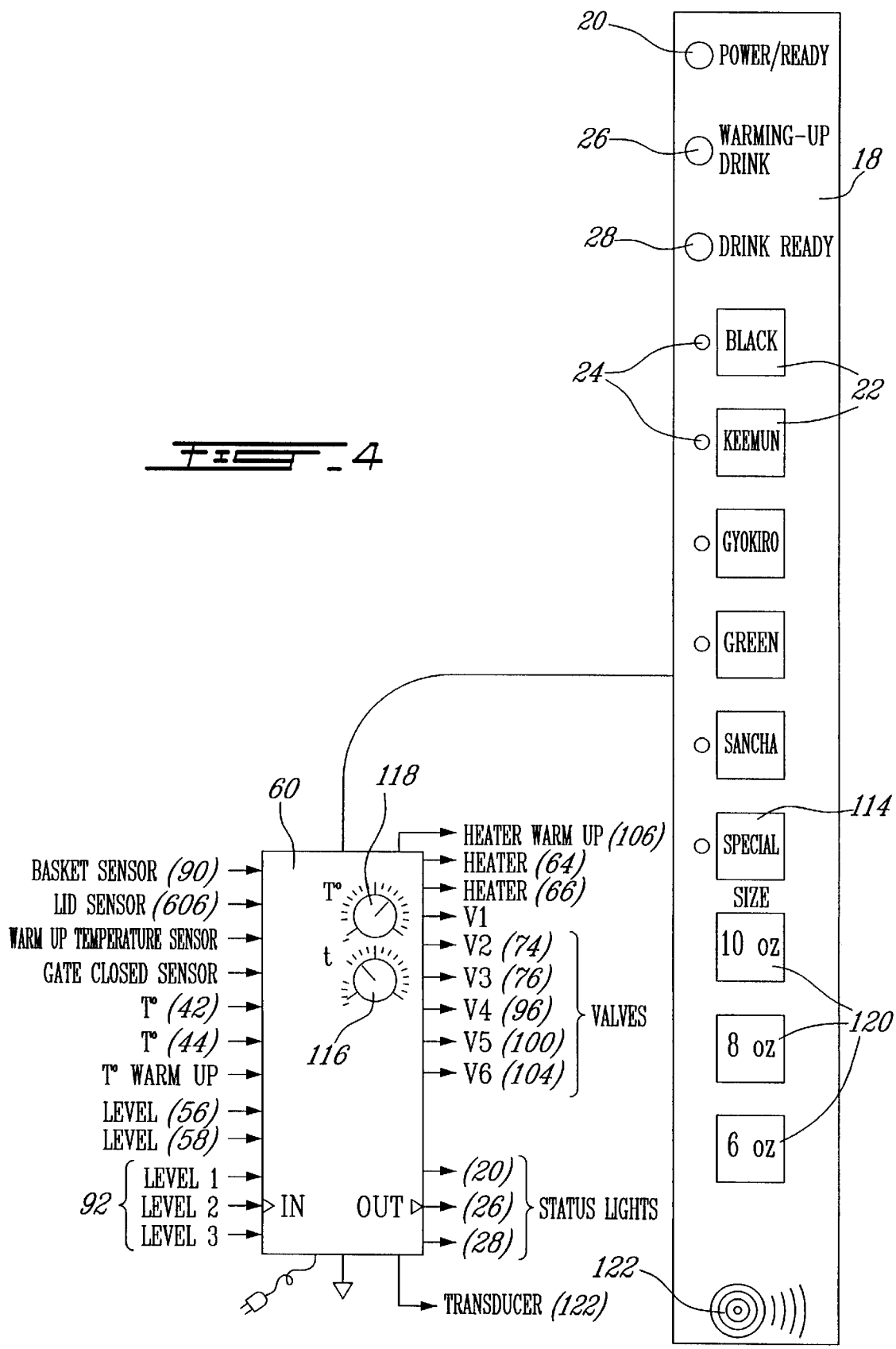

METHOD AND APPARATUS FOR THE PREPARATION OF HOT BEVERAGES

FIELD OF THE INVENTION

The present invention relates to a method and apparatus for preparing hot beverages. In particular, but not exclusively, the present invention relates to a method and an associated apparatus for the preparation of a range of teas, the infusion of each type of tea being controlled in terms of water temperature and infusion time.

BACKGROUND OF THE INVENTION

Different varieties of tea, for example, the three major types of tea: black tea; green tea; or oolong; require very specific brewing conditions for optimal extraction of polyphenols (tannins), theine (caffeine) and aromatic oils. Additionally, a too lengthy duration of infusion may yield a bitter taste in certain teas.

Tea leaves of different varieties may vary greatly in terms of their volumetric density and a given weight of tea leaves may therefore represent a widely variable volume of leaves and surface area which will be exposed to water during the infusion process. Lower density teas generally require a longer duration of infusion in order to provide full extraction of the flavour. Also, according to their individual characteristics, teas of different varieties require different infusion temperatures for optimal flavour extraction. Through experimentation, preferred infusion duration and temperature may be determined for the optimal preparation of a variety of fine teas. Of note, however, is that a relatively constant mass of tea leaves is required for the preparation of a given volume of tea, regardless of the type.

For instance, Gyokiro requires 2 minutes of infusion at a temperature of 50° C. while Keemun must be infused at a temperature of 95° C. for 3 minutes and Sencha is best prepared at a temperature of about 75° C. for 2 minutes. Some very light white teas may require up to 12 minutes of infusion at low temperature (for example 65° C.) for optimal taste.

In order to support the preparation of fine teas in tea rooms, tea sections of coffee shops and restaurants, a method and apparatus capable of providing high quality teas on a commercial basis is required.

A number of devices have been developed to assist in the preparation of tea, but these devices present major limitations.

For example, in U.S. Pat. No. 5,188,019, issued to Vahabpour on Feb. 23, 1993, boiling water from a reservoir is conveyed into a strainer containing the tea leaves by activation of a manually operated valve. After a user evaluated infusion time, a second manually operated flow valve can be operated to pour the prepared tea into a serving vessel, while simultaneously mixing the tea with water to reduce strength. Although the tea leaves are in contact with the hot water for an extended amount of time, the user is required to determine the proper length of time for brewing the tea.

U.S. Pat. No. 4,888,466, issued to Hoffmann on Dec. 19, 1989, discloses a machine for making hot tea in which boiling water is automatically conveyed through a riser to an infusion receptacle provided with a discharge valve at its bottom. The discharge valve can be electro-mechanically controlled so as to provide automatic discharge of the beverage into the serving vessel after a desired infusion time has elapsed. This design, however, does not provide for the selection of a desired infusion temperature and provides no indication of the appropriate infusion time for a given type of tea.

The majority of these tea preparation devices are based on a drip principle, similar to that typically used in drip-brew coffee machines, where boiling water is pumped and dispensed over a soft filter basket containing the leaves and supported into a rigid closed basket comprising an outlet at its lower end. The continuously circulating hot water extracts flavour contained in the tea leaves and exits the basket through a possibly adjustable outlet, filling a serving vessel. Although an adjustable outlet enables a user to set the time required for a volume of water to pass from the filter basket through the outlet and to the serving vessel, such a concept cannot ensure that each leaf is able to loosely float in water for the specific period of time required to optimally dissipate its flavour.

Additionally, with such a concept, infusion time varies as a function of the volume of water to flow through the outlet, which is inadequate since preparation of a larger volume of tea with the accordingly selected mass of leaves (e.g. 4 g per 225 ml of beverage) should take no longer than for a smaller volume in optimal conditions. Furthermore, the concept generally operates with boiling water, which is often too hot for optimal infusion of fine teas. U.S. Pat. No. 5,901,635 issued to Lucas et al. on May 11, 1999 and U.S. Pat. No. 4,825,758 issued to Snowball on May 2, 1989 provide examples of such automatic drip type tea brewing machine offered for commercial use.

Japanese application No JP2013693 (Murakami—laid open in February 1992) teaches a sophisticated tea vending machine also based on the drip principle. Nevertheless, it features the use of two or more hot water reservoirs maintained at different temperatures and from which water is selectively drawn according to the type of tea to be prepared. Once again, however, proper control of the extraction of the flavour from tea leaves can not be achieved as there is no through wetting by contact with surrounding water for a required period of time.

Another highly automated brewer intended for black tea beverage preparation is disclosed in Japanese application JP10328031 (Fugiwara), laid open on Dec. 15, 1998. The brewer provides for infusion with agitation of the leaves to promote contact with water and two infusion times depending on the leaf size (Large: 2'30" or Small; 4'30") as inputted by the user. The beverage is automatically discharged into the serving vessel when the steeping time is elapsed. The apparatus also determines from a chart and weights the quantity of leaves required as a function of the number of servings indicated by the user. It is apparent, however, that the apparatus has not been designed to provide the level of versatility required for the preparation of the three major types of tea. The principal limitation being the unique infusion water temperature set to 90° C. and the choice from two infusion times only. Moreover, this device does not allow for the controlled re-heating of a tea infused at a low temperature or come equipped with practical commercial features, such as automatic flush cleaning of the infusion chamber and other parts coming into contact with the tea prior to preparation of a new batch of potentially different types of tea.

From the above survey of tea preparation methods and apparatuses, it is apparent that they fail to respond to the need for the automatic preparation of a wide range of fine teas according to optimal conditions as provided by the traditional methods. There is thus a need for a method and an apparatus responding to the increasing market need for automatic preparation of fine teas for use on a commercial basis in tea rooms, tea sections of coffee shops or restaurants.

SUMMARY OF THE INVENTION

The present invention relates to a method for producing a quantity of a hot beverage, comprising:

providing a source of a liquid having an adjustable temperature;

selecting an infusion time and an infusion temperature;

supplying from the source liquid substantially at the selected infusion temperature, the supplied liquid having a volume equal to or slightly larger than the quantity;

mixing the supplied liquid with a flavour ingredient having the selected infusion time and infusion temperature;

infusing the flavour ingredient in the supplied liquid substantially for the selected infusion time whereby the flavour ingredient is at least partially dissipated in the supplied liquid thereby forming a brew; and following the infusion time, removing an undissipated portion of the flavour ingredient from the brew thereby yielding the beverage.

The present invention also relates an apparatus for producing a quantity of a hot beverage comprising:

a hot beverage production controller;

a source of a liquid having an adjustable temperature connected to the controller;

a selector of infusion time and infusion temperature connected to the controller;

a valve system interposed between the source and an infusion chamber, the valve system being connected to and controlled by the controller to supply liquid substantially at the selected infusion temperature from the source to the infusion chamber;

the infusion chamber for infusing a flavour ingredient with the liquid substantially at the selected infusion temperature substantially for the selected infusion time, wherein the infusion chamber has an outlet, the flavour ingredient has the selected infusion time and infusion temperature, and the flavour ingredient dissipates in the liquid thereby forming a brew;

a dispensing circuit interposed between the outlet of the infusion chamber and a vessel, and connected to and controlled by the controller to discharge the brew into the vessel; and a mechanical filter disposed for removing an undissipated portion of the flavour ingredient from the brew prior to discharging it in the vessel.

The foregoing and other objects, advantages and features of the present invention will become more apparent upon reading of the following non-restrictive description of illustrative embodiments thereof given for the purpose of illustration only with reference to the accompanying drawings.

BRIEF DESCRIPTION OF THE DRAWINGS

FIG. 4 is a schematic representation of a control panel and controller of the apparatus of FIG. 1 showing the electrical connections to the other elements of the apparatus;

DETAILED DESCRIPTION OF THE ILLUSTRATIVE EMBODIMENTS

The illustrative embodiments of the method and apparatus for preparation of hot beverages by infusion according to the present invention will now be described.

Figure 1:
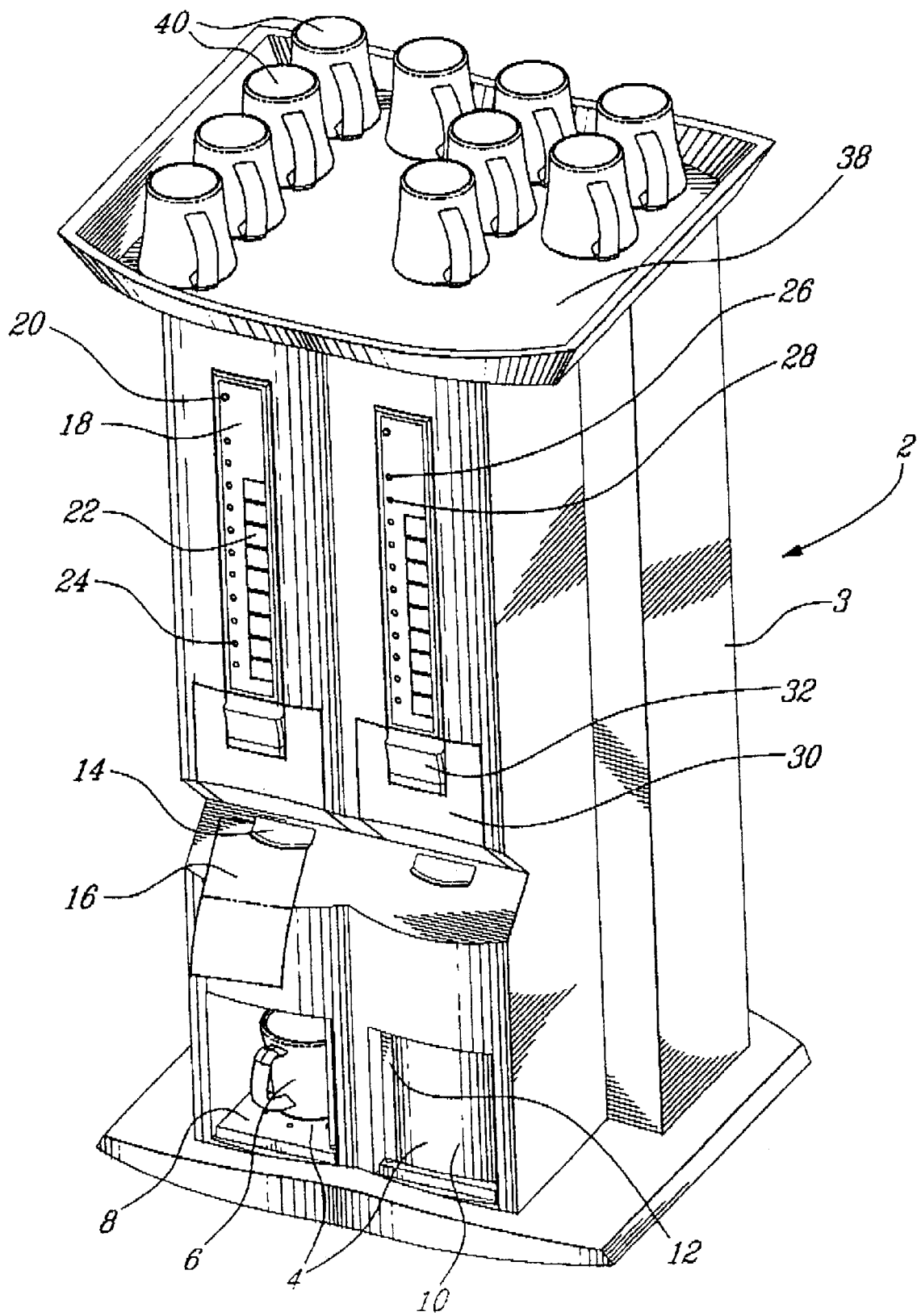
FIG. 1 is an isometric side elevation view of an apparatus for preparing hot beverages according to a first illustrative embodiment of the present invention.

Referring to FIG. 1, there is illustrated an apparatus for the preparation of hot beverages by infusion, generally represented by the numeral 2. The apparatus 2, as illustrated, typically comprises an outer casing enclosing two substantially independent brewing stations such as 4 Two brewing stations provide a higher level of productivity. Each brewing station 4 comprises a compartment to receive a cup 6, this compartment having a drain grid 8 to capture any overflow or spill or fluid used to self-flush the system during cleaning. A gate 10 equipped with a handle 12 is provided to close the cup-receiving compartment of each brewing station 4. This gate 10 is closed during self-cleaning, impeding the escape of any fluid and also improving the aesthetic appearance of the apparatus 2, for example when the apparatus 2 is not in use. A clip 14 is provided above each brewing station 4 for attaching, for example, an order slip 16 or similar.

Although the first illustrative embodiment of the present invention is herein described in relation to a pair of brew stations, it will be apparent to one of ordinary skill in the art that a single or a plurality of brewing stations may be assembled in a common housing, sharing or not common water sources and a common controller in order to provide higher productivity and versatility and match the needs of a variety of commercial applications. A liquid other than water could also be used.

Each brewing station 4 has an associated control panel 18 equipped with an upper power indicator light 20 to indicate electrical supply of the apparatus with electrical power. The associated panel 18 is also equipped with a series of control buttons such as 22 for selection of the beverage to be brewed at the brewing station 4 and the quantity thereof. Associated with each control button 22 is a control button indicator light 24 for providing a visual indication of the type and quantity of beverage selected. Additionally, indicator light 26 is provided to indicate that a beverage is being warmed up and indicator light 28 is provided to indicate that the selected beverage is now ready. Further associated with each brewing station 4 is an infusion chamber access door 30 and infusion chamber access door handle 32 for accessing (see FIG. 2) an infusion chamber 34 thereby allowing a filter basket 36 containing the appropriate flavour ingredient to be placed in the infusion chamber 34.

The top of the apparatus is formed as a ridged storage tray 38 providing handy storage of, for example, clean cups such as 40.

Figure 2:
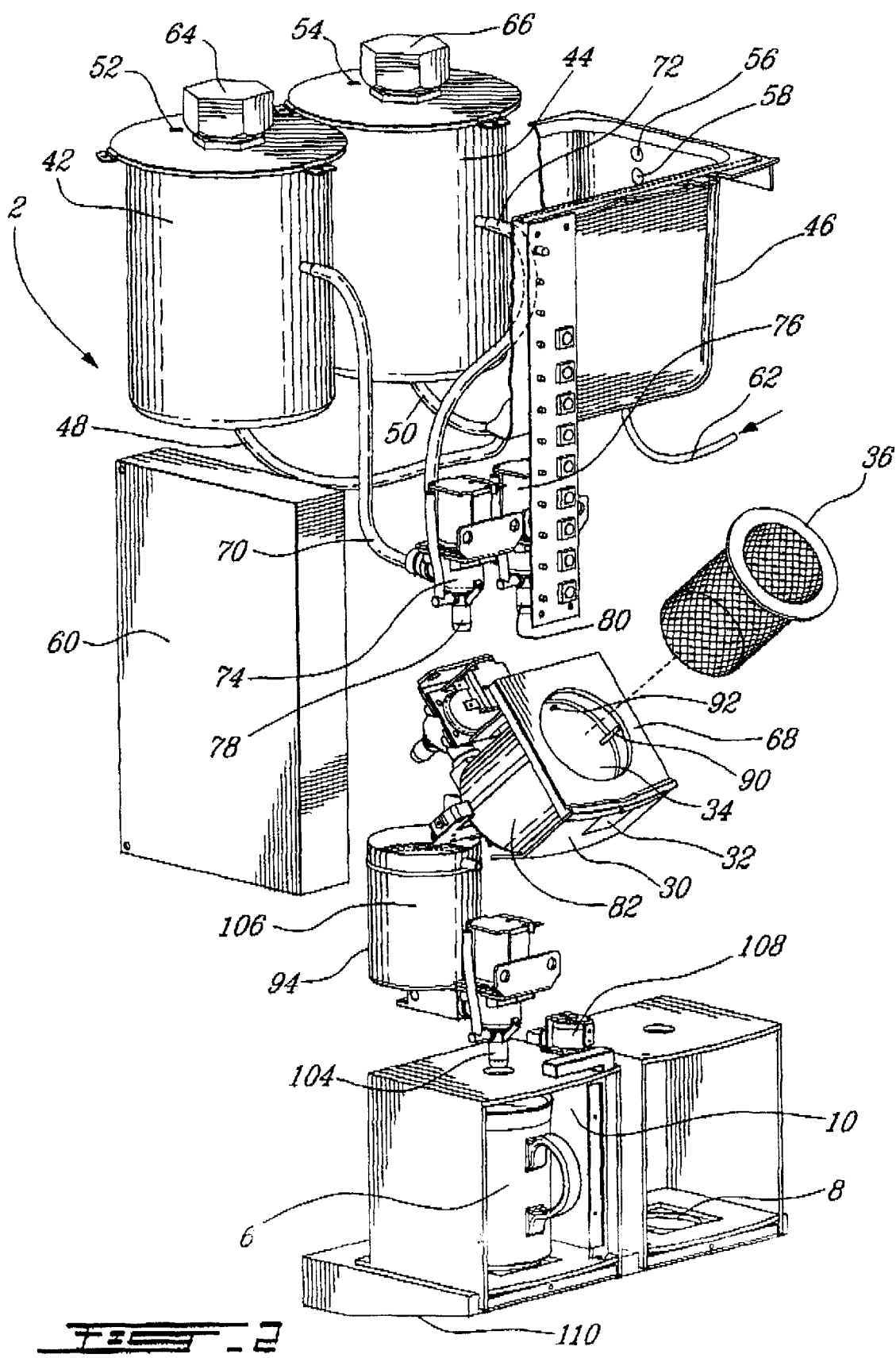
FIG. 2 is an isometric side elevation view from left hand side of the apparatus of FIG. 1, with an outer casing removed, showing an infusion chamber in an open position as well as main elements of one of two hot beverage preparation stations.

Referring now to FIG. 2, the apparatus 2 first comprises two hot water reservoirs 42 and 44 each being fed by gravity at its base with cold water through the base of a common main reservoir 46 (shown cutaway in FIG. 2) via tubes 48 and 50. The common main reservoir 46 is located at the same vertical level as the reservoirs 42 and 447 which have their top portion maintained at atmospheric pressure through vents 52 and 54 respectively. Therefore, the water in all reservoirs 42, 44 and 46 tends to stabilise at the same absolute level should water be drawn from reservoirs 42 and/or 44 or added to main reservoir 46.

Main reservoir 46 is provided with a pair of liquid level sensors (or indicators) 56 and 58 connected to the electronic controller 60 which controls an external pump/feed valve assembly (not shown, see V1 in FIG. 4) connected to an external source of cold water (not shown). The pump/feed valve assembly feeds fresh water to the communicating reservoirs through feed tube 62 when a low level is detected by lower sensor 58 and stops feeding when a full level is detected by upper sensor 56. Alternatively, single point liquid level detection may also be used for each reservoir, while providing for hysteresis in the control of the valve through time delays or other means, in order to prevent too frequent cycling of the pump/feed valve assembly switching.

Each one of water reservoirs 42 and 44 is also provided with a thermostatic water heating system 64, 66 controlled by controller 60 to heat water in each reservoir to a different temperature to enable performing the infusion at different predetermined readily available water temperatures. Typically one water reservoir is heated to 95° C. and the other to 50° C. Hot water from reservoirs 42 and 44 is tapped at a level near the top of the water columns and directed toward an infusion chamber assembly 68 through respective outlet tubes 70 and 72 connected to the inlets of source valves 74 and 76 respectively. Dispensing outlets 78 and 80 of, respectively, source valves 74 and 76 are in turn in direct fluid communication with the top of the infusion chamber 34. Outlet tubes 70 and 72 are connected to their respective reservoirs 42 and 44 at such a height above the dispensing outlets 78 and 80 that sufficient hydrostatic pressure (head) is provided to feed the infusion chamber 34 by gravity at adequate flow rates. It should be noted that the system design assures that both hot water feed lines have substantially identical hydrostatic pressures and elements (outlet tubes 70 and 72 and source valves 74 and 76), such that substantially identical water flows are obtained at the dispensing outlets 78 and 80.

Given the above described symmetry, it will be apparent to one of ordinary skill in the art that appropriate control of source valves 74 and 76 by the electronic controller 60, infusion can be carried out not only with water from either reservoir 42 or reservoir 44, but also with a mixture of water drawn from both of these reservoirs, thus providing the possibility of performing the infusion at an intermediate temperature. Indeed, the symmetry of both water supply systems enables for the selective mixing of water from both reservoirs 42 and 44 in a definite ratio by merely simultaneously cycling source valves 74 and 76 for accordingly set, and potentially different time delays. For example, equal delays would provide a 50:50 mixing ratio and a temperature of the infusion water that is proximate to the arithmetic mean of the temperatures of water in the reservoirs 42 and 44.

Figure 3:
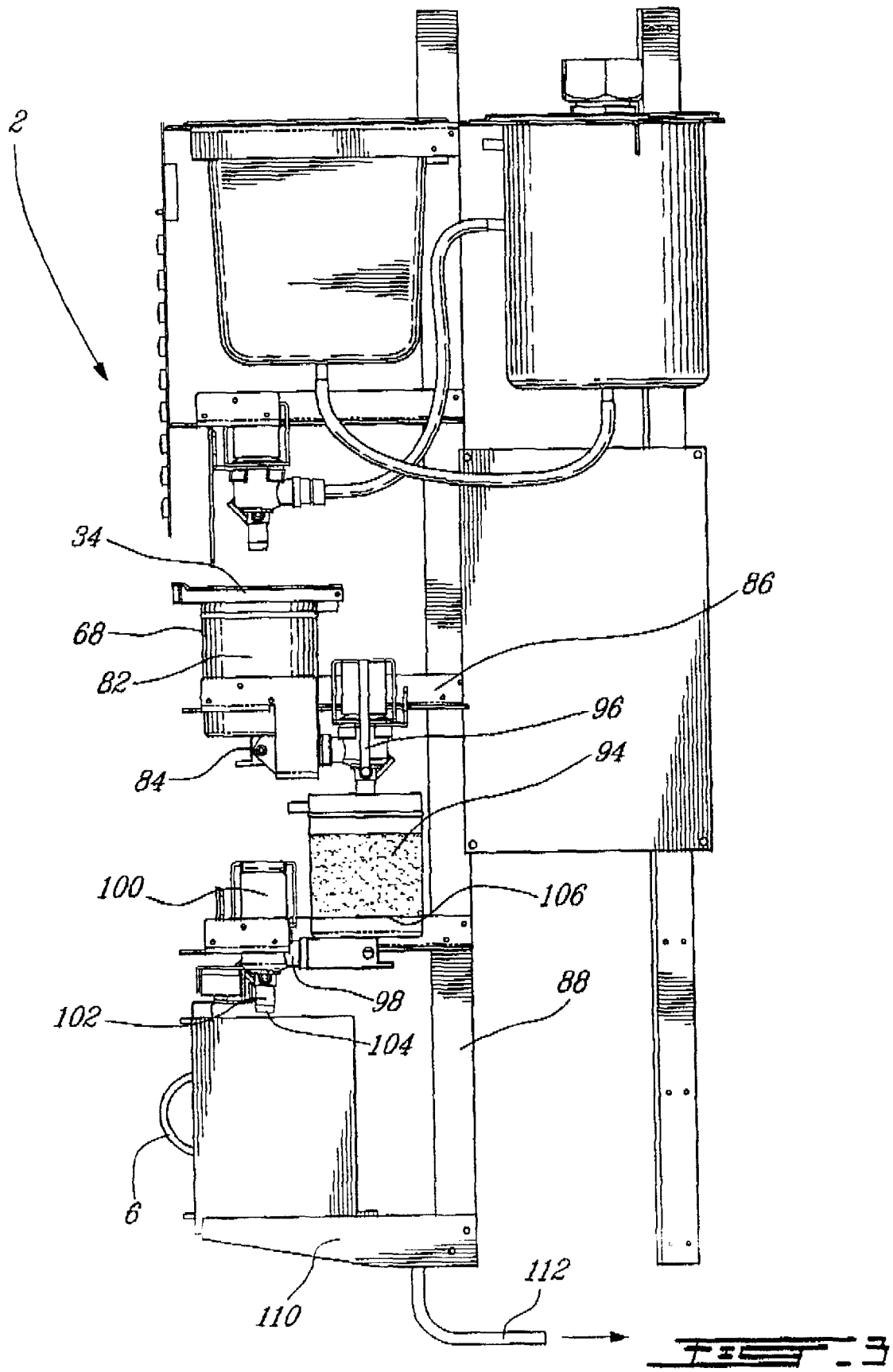
FIG. 3 is a side elevation view from the right hand side of the apparatus of FIG. 1, with the outer casing removed, showing the main elements of one of the two hot beverage preparation stations with an infusion chamber in a closed position.

Referring now to FIG. 3 in addition to FIG. 2, the apparatus 2 comprises an infusion chamber assembly 68 itself comprising an infusion chamber 34. The latter infusion chamber is provided with a thermally insulated housing 82 pivotally assembled at pivot 84 to a rigid bracket 86 which, in turn, is connected to a main frame assembly 88. A filter basket 36 is removably installed into chamber 34 and a filter basket presence switch 90 is electrically connected to controller 60 and so located as to indicate the presence or absence of filter basket 36 in the infusion chamber 34. In addition, at least one liquid level sensor such as 92 is installed in the infusion chamber 34 and is electrically connected to controller 60 to indicate when a desired level of liquid is reached in the infusion chamber 34. The infusion chamber assembly 68 can be pivoted about pivot 84 to thereby pull out this assembly 68 by pulling the handle 32 mounted on the infusion chamber access door 30, thus allowing the insertion or removal of the filter basket 36.

It will be apparent to one of ordinary skill in the art that when at least one of the source valves 74 and 76 is triggered by the controller 60, hot water from the corresponding reservoir 42 or 44 is supplied to the filter basket 36 through the open top thereof, or directly into infusion chamber 34 when filter basket 36 has been removed. The supplied hot water thereby mix with any flavour ingredients (not shown) contained in the filter basket 36 or infusion chamber 34. Mixing of flavour ingredients with hot water causes the flavour ingredients to at least partially dissipate in the water, thereby creating a brew.

On transfer of the brew out of the infusion chamber 34 following expiration of the appropriate infusion time, any undissipated flavour ingredients or other residues, for example larger particulate matter such as tea leaves, remain behind in the filter basket 36. These residues can be discharged by removing the filter basket 36 from the infusion chamber 34 and either cleaning or replacing the filter basket 36. Insertion and withdrawal of the filter basket 36 is enabled through tilting of the chamber assembly 68 outwardly about the pivot 84 using the handle 32 as described in the foregoing description.

Referring now to FIG. 3, the apparatus 2 further comprises, for each brew station, a warm-up chamber 94 in fluid communication with the tower end of infusion chamber 34 through transfer valve 96 assembled to the lower portion of the infusion chamber assembly 68 and controlled through the controller 60.

Similarly, the lower end of the warm-up chamber 94 is in fluid communication with the inlet 98 of dispensing valve 100 also controlled through the controller 60. The outlet 102 of dispensing valve 100 is connected to a dispensing nozzle 104 through which the prepared hot beverage can be dispensed into a cup 6. In order to enable cleaning of the infusion chamber 34 and the warm-up chamber 94 through purging, the lower ends thereof are formed into a funnel shape and are respectively in fluid communication with valves 96 and 100.

The warm-up chamber 94 is provided with a temperature sensor (not shown), such as a thermistor, to indicate to controller 60 the temperature of the internal wall of warm-up chamber 94, and eventually of a brew contained therein. Furthermore, an electrical band heater 106 is mounted on the external wall of the warm-up chamber 94. Band heater 106 constitutes a source of heat for warming up the brew inside chamber 94 to a serving temperature, typically about 75° C. The source of heat is spread substantially over the surface of the external wall of the warm-up chamber 94. Chamber 94 is made of a corrosion proof and heat conductive material such as stainless steel. Heat is therefore communicated to the infused beverage inside warm-up chamber 94 without creating excessive hot points which could bring the beverage to boiling locally and alter its properties and taste. A thermal isolation material is provided on the outside of the warm-up chamber 94 to limit heat losses, reduce power requirements and speed up the warming up of beverages.

Referring back to FIG. 2, a cup presence sensor (not shown) indicates to the controller 60 the presence or absence of a cup 6 under the dispensing nozzle 104. This prevents a ready hot beverage being dispensed prior to a cup being placed under the dispensing nozzle 104 also controlled by the controller 60. Therefore, the beverage is kept at the serving temperature in the warm-up chamber 94 until it is served.

The gate 10 is equipped with a gate-closed sensor (not shown) indicating to the controller 60 when the gate has been correctly shut, Additionally, a solenoid actuator 108 enables the controller 60 to lock the gate 10 in a closed position when hot water is being circulated through the system during self-cleaning.

Controller 60 of the apparatus 2 is able to perform periodic self-cleaning flush cycles. During a flush cycle, hot water is circulated from the hottest water reservoir through the infusion chamber 34 and warm-up chamber being subsequently ejected into the drain grid 8 via the nozzle 104. A flush cycle will take place, for example, when the filter basket presence switch 90 indicates to the controller 60 removal of the filter basket 36 at the end of an infusion cycle. For safety purposes, dispensing of the waste hot cleaning water is enabled only when the system detects a closed gate status through the gate closed sensor, indicating that the gate 10 is locked thereby preventing hot water from escaping. Whenever purging of the waste fluid is enabled, dispensing valve 100 is triggered and the waste water is dispensed into a waste recuperating vessel 110 through the drain grid 8. The waste recuperating vessel 110 can be periodically emptied by hand or, as illustrated in FIG. 3, continuously purged into a drain through a drain tube 112 in fluid communication with the lower end of vessel 110.

Referring now to FIG. 4, for each brewing station 4 the control panel 18 is used by an operator to communicate commands to the controller 60 via a series of control buttons such as 22. At the same time, the control panel 18 indicates current operational status via indicator lights 20, 26 and 28 as well as current selections via indicator lights such as 24. Interconnections of inputs and outputs of controller 60 to the sensors and controllable members of the apparatus 2 are also represented in FIG. 4. In the first illustrative embodiment of the apparatus 2, at least six (6) control buttons such as 22 are provided, each one triggering the start of a distinct hot beverage preparation program stored in controller 60.

Each hot beverage preparation program refers to and selects a specific infusion temperature and infusion time combination according to the requirements of the beverage to be prepared. For example, a green tea can be automatically prepared by pressing the button 22 (GREEN) corresponding to three (3) minutes of infusion at a temperature of 95° C. Although most program buttons such as 22 refer to factory set and carefully selected values of infusion temperature and time, at least one additional key such as 114 may be provided to start a special user settable custom program. The infusion temperature and time can be adjusted respectively through an infusion time selector 116 and an infusion temperature selector 118 both provided on the controller 60.

Optionally, serving size buttons such as 120 can be provided to select the volume of beverage to be prepared. For that purpose, a plurality of level sensors 92 are located inside the infusion chamber 34, and depression of one of the buttons 120 causes selection of one sensor 92 corresponding to the selected volume of beverage. The selected sensor 92 will provide the controller 60 with a feedback signal to fill the infusion chamber 34 with the appropriate volume of hot water through control of the valves 74 and/or 76. Selecting the volume of water to be dispensed into the filter basket 36 and the infusion chamber 34 can also be used to control the preparation of servings of similar net volume (size) from ingredients (for example, tea leaves) characterised by substantially different water absorption characteristics. In this regard, given the varying rates of absorption of water by differing ingredients it will be apparent to one of ordinary skill in the art that a given ingredient may require a slightly greater quantity of hot water to yield an amount of beverage.

The three-state indicator light 20 turns red to indicate that power is supplied to the apparatus 2, and turns green once the apparatus 2 is ready to prepare a hot beverage. The apparatus 2 is ready to prepare a hot beverage when, referring to FIG. 2 in addition to FIG. 4, reservoirs 42 and 44 contain sufficient water at the required temperature.

When a beverage preparation cycle is started, a red indicator light such as 24 is illuminated to indicate that the brewing station 4 is busy, carrying out the infusion operation. The transfer valve 96 is closed and the water source valves 74 and 76 are selectively actuated (opened) by the controller 60 according to a time-on ratio determined by the selected water temperature. These source valves 74 and 76 are automatically shut-off when the selected fluid level sensor 92 in infusion chamber 34 indicates that the appropriate level (volume) of water for preparation of the selected beverage size has been supplied. The controller 60 then starts the infusion cycle and at the same time commences heating the warm-up chamber 94, typically to an inside wall temperature of marginally higher than 75° C. to build-up a heat reserve. Indeed, a relatively small heating power is provided to prevent overheating of the beverage and to limit the total power requirement of the apparatus. Therefore, heating is started in advance and the thermal energy is stored in the warm-up chamber 94 walls, which are manufactured from a relatively high mass of heat absorbing material.

After the required infusion time has expired, the controller 60 activates the transfer valve 96 for a predetermined period of time to transfer the hot beverage to the warm-up chamber 94. The yellow indicator light 26 is then illuminated, indicating that the warm-up operation is being carried out. The beverage temperature is then continuously monitored through a temperature sensor (not shown) until the serving temperature, typically 75° C., is reached. It wilt be apparent to one of ordinary skill in the art that when infusion is carried out at a temperature higher than the serving temperature, warm-up may not be required and the serving temperature will rapidly be detected. At that time, controller 60 halts heating of the warm-up chamber 94, illuminates a green indicator light 28, indicating that the beverage is ready, and optionally activates an audible signal through an acoustic transducer such as 122. At this point, the gate switch (not shown) is continuously monitored. If the presence of a cup 6 is sensed through the cup presence sensor (not shown), or alternatively through detection of an open gate condition, dispensing valve 100 is triggered for a fixed period of time sufficient to dispense the largest size of beverage into the cup 6.

Referring now to FIG. 2 and FIG. 3, in order to access the filter basket 36, the infusion chamber assembly 68 can be moved from its operating position to an open position by pulling the handle 32, thereby tilting the infusion chamber assembly 68 about pivot 84. By removing the filter basket 36 from the infusion chamber 34, the filter basket presence switch 90 changes its status thereby allowing the controller 60 to detect the absence of a filter basket in the infusion chamber 34. Once the infusion chamber assembly 68 is placed back in its normal operating position, and provided the gate 10 is closed, a flush cycle is started to clean all fluid lines and chambers with the hottest water contained in reservoirs 42 and 44. Following the flush cycle, a new beverage may be prepared by opening the infusion chamber assembly 68, placing a determined quantity of flavour ingredient (e.g. tea leaves) into a filter basket 36, placing the filter basket 36 into the infusion chamber 34, closing infusion chamber assembly 68, and depressing a control button 22. Optionally a beverage serving size button as in 120 can be depressed.

Figure 5B:
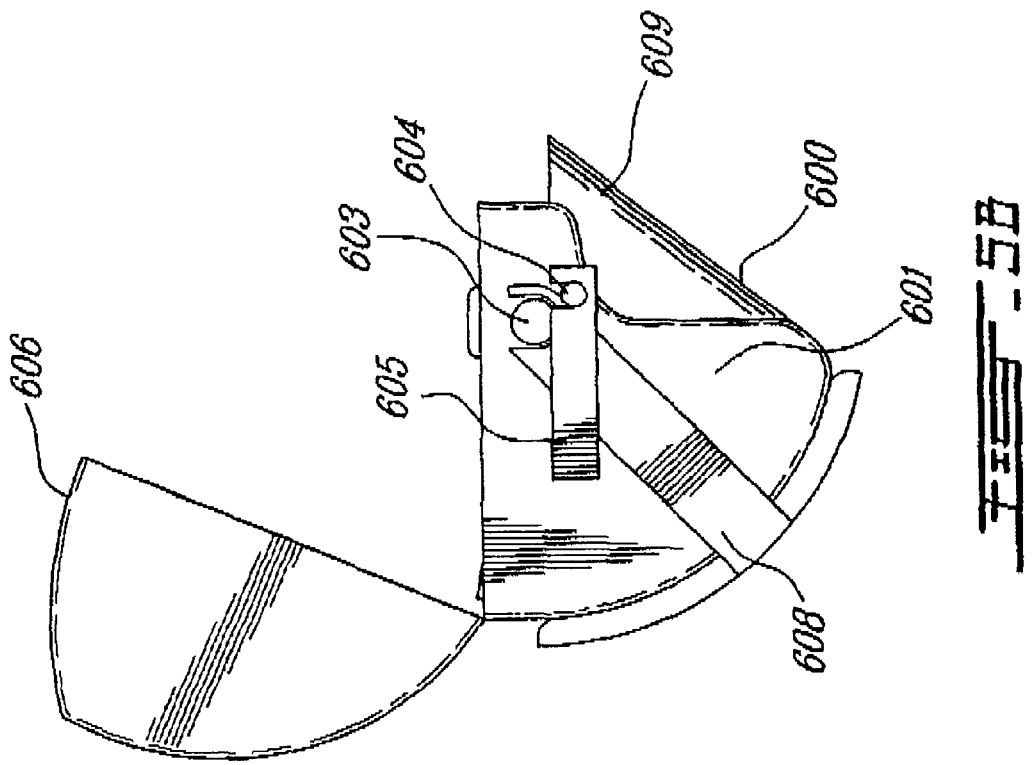
FIG. 5b presents a second isometric side elevation view of a combined infusion/warm-up chamber of the apparatus according to the first illustrative embodiment of the present invention.
Figure 5A:
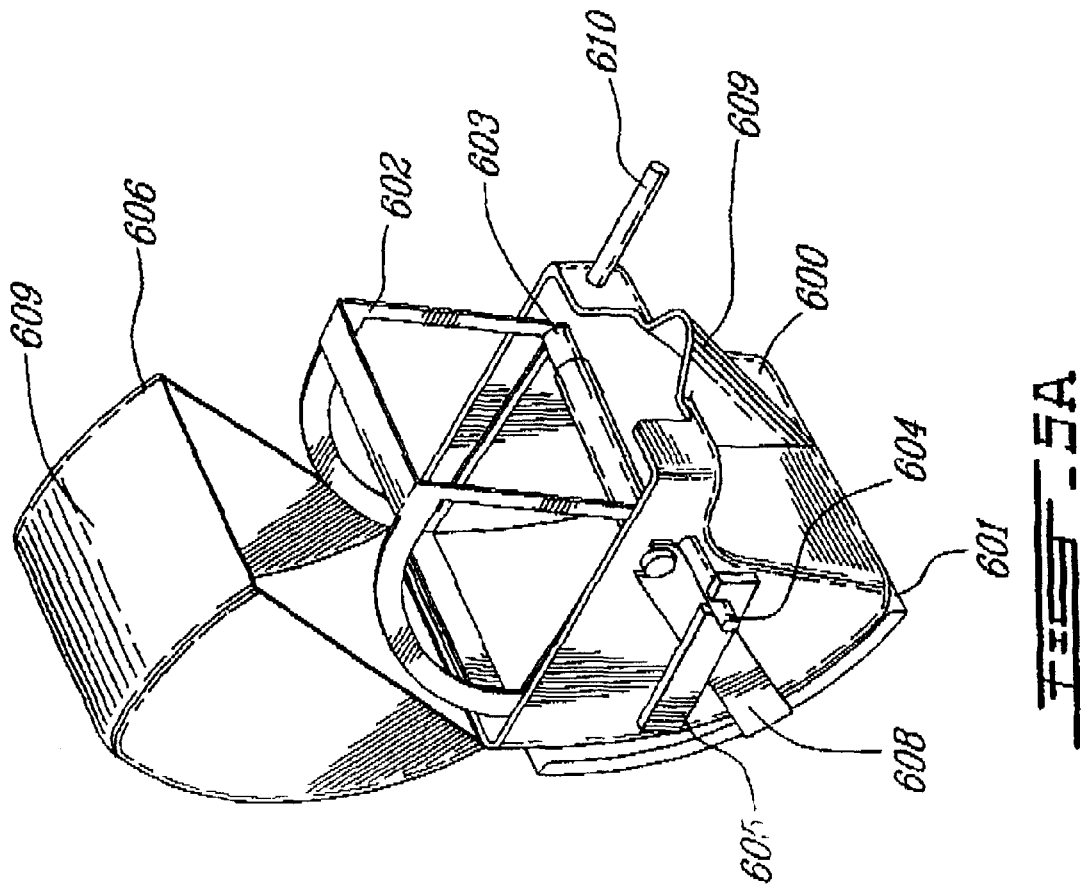
FIG. 5a presents a first isometric side elevation view of a combined infusion/warm-up chamber of the apparatus according to a second illustrative embodiment of the present invention.
Figure 5C:
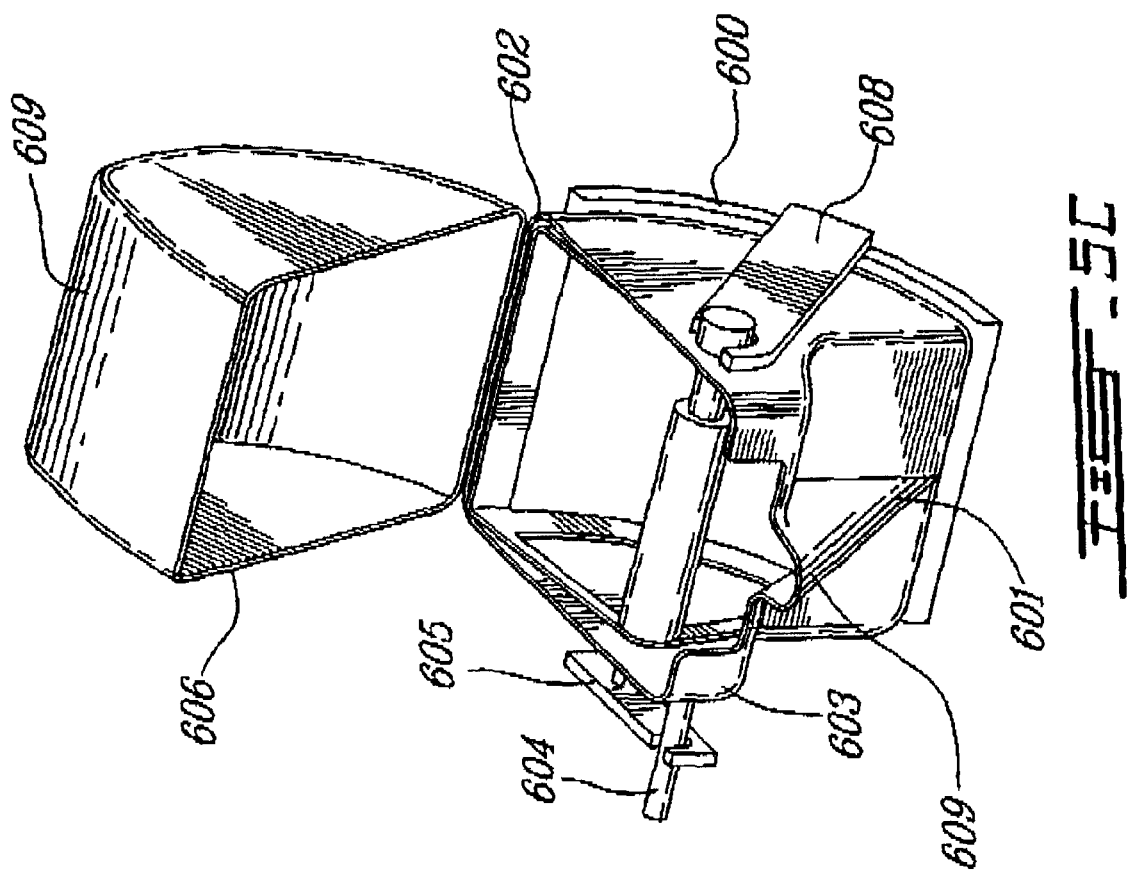
FIG. 5c presents a third isometric side elevation view of a combined infusion/warm-up chamber of the apparatus according to said first illustrative embodiment of the present invention.

Turning now to the second illustrative embodiment of the apparatus 2, FIGS. 5a), 5b) and 5c) illustrate a combined infusion/warm-up chamber assembly 600 replacing the infusion chamber assembly 68, warm-up chamber 94, and transfer valve 96 (see FIGS. 2 and 3). Assembly 600 comprises a combined infusion/warm-up chamber 601 and a lid 606 provided with a clear window 609.

Combining both chambers requires withdrawing the filter basket from the liquid (typically water) to stop steeping when the infusion time has elapsed and the hot beverage preparation cycle enters the warm-up phase. This is automatically accomplished by forming combined chamber 601 into a semicircular profile and providing a similarly shaped conforming filter basket 602 pivoting about an axle 603 forming a rod extension 604 connected to a transverse arm 605. Arm 605 is in turn connected to a bi-directional linear actuator (not shown). Optionally, the axle 603 can be rectangular in cross-section and rotated by a filter rotary actuator (not shown). The actuator is controlled through the controller 60 in order to automatically insert and withdraw the filter basket 602 from the hot water and thereby respect the infusion time required to prepare the hot beverage. The semicircular chamber 601 is also pivotally mounted about a central axis on support bracket 608 and can be tilted forward by hand or by an actuator (not shown) under the control of the controller 60 to pour the hot beverage into a serving vessel through a spout such as 609 of the chamber 601. Alternatively, chamber 601 may be stationary and provided with a dispensing outlet and valve (not shown) at its lower end.

Hot water can be supplied to the chamber 601 through, for example, conduit 610.

Of course, the lid 606 is pivoted to open chamber 601 and enable access to the basket 602 to replace the flavour ingredient. A sensor (not shown will allow the controller 60 to detect opening of the lid 606 in order to disable operation of the apparatus 2.

Finally, a heater (not shown) will be provided to warm-up the brew.

Figure 6:
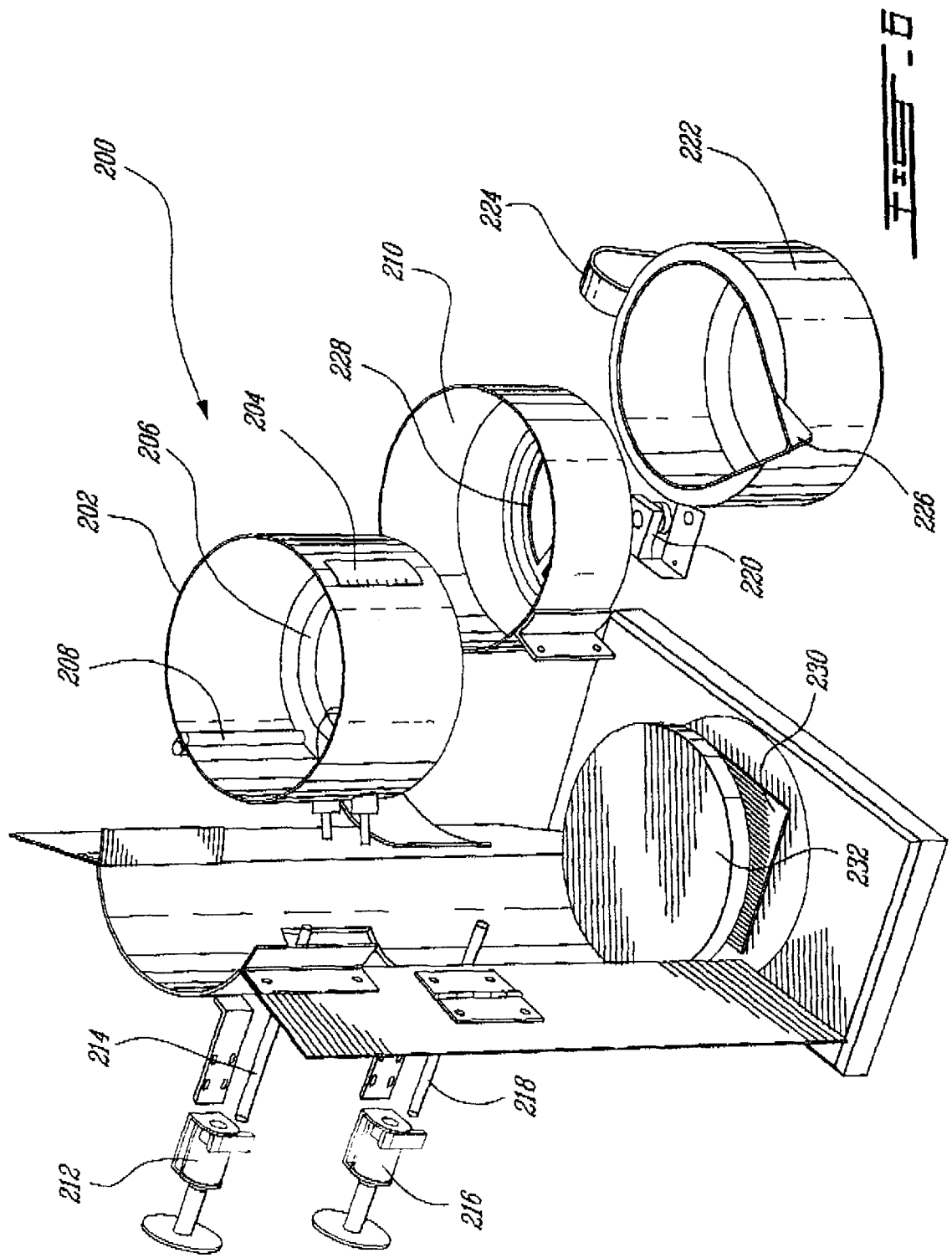
FIG. 6 is an isometric side elevation view of an apparatus for preparing hot beverages according to a third illustrative embodiment of the present invention.

Referring to FIG. 6, a third illustrative embodiment 200 of the apparatus for the preparation of hot beverages is illustrated.

The apparatus 200 comprises a reservoir 202 for receiving a certain quantity of liquid, typically water (not shown). The level of liquid is visible through a transparent window 204 located in front of the reservoir 202. A heating element 206 is disposed in the bottom of the reservoir 202 to heat the liquid poured therein. The temperature of the liquid is controlled through a thermostat 208. Both the thermostat 208 and the heating element 206 are electrically connected to a controller (not shown) such as controller 60.

An infusion chamber 210 is mounted directly below the reservoir 202 The flow of liquid from the reservoir 202 into the infusion chamber 210 is carried out through a source valve (not shown). Opening and closure of the source valve is controlled through a first solenoid assembly 212 including a rod 214. Actuation of the first solenoid assembly 212 causes the rod 214 to move axially and thereby open the source valve (not shown). Opening of this source valve causes the liquid to flow from the reservoir 202 to the infusion chamber 210. The first solenoid assembly 212 is electrically connected to the controller (not shown).

Prior to liquid being transferred therein, an adequate amount of flavour ingredient (typically tea, not shown) is placed in the infusion chamber 210. Once the liquid in the reservoir 202 reaches the optimal temperature of infusion as pre-programmed into the controller and selected by the user at the beginning of the infusion cycle, the liquid from the reservoir 202 is released by the source valve (not shown) and transferred into the infusion chamber 210 where it mixes with the flavour ingredient to form a brew. Once the optimal infusion time as pre-programmed into the controller and selected by the user at the beginning of the infusion cycle has elapsed, the controller (not shown) activates a second solenoid assembly 216. The optimal time and temperature of infusion can be selected through a push-button control panel such as 18 of FIGS. 1, 2 and 4 associated to the controller. This second solenoid assembly 216 is electrically connected to the controller and includes a rod 218. Activation of the second solenoid assembly 216 causes the rod 218 to move axially and open an infusion valve 220 thereby allowing the brew held in the infusion chamber 210 to flow into a vessel, for example a removable carafe 222. The carafe 222 is typically fabricated from a heat resistant transparent material such as glass and is provided with a handle 224 and spout 226 so that it may serve as a handy serving pot.

A flat filter 228 is placed on the bottom of the infusion chamber 210 to deter the flow of larger particulate matter from the infusion chamber 210 into the carafe 222. After the infusion cycle this particulate matter may be removed from the infusion chamber 210 by removing it from the apparatus 200 and flushing it with clean water. Additionally, a standard paper or gauze coffee/tea filter (not shown) can also be placed in the infusion chamber 210 prior to adding flavour ingredients in order to simplify their removal after infusion.

A heating plate 230 is disposed at the bottom of the apparatus 200 for heating a brew contained in the carafe 222 to the brew's optimal serving temperature. The heating plate 230 is electrically connected to and controlled by the controller (not shown) and a second thermostat (not shown) disposed in the base plate 232. Of course, the thermostat is electrically connected to the controller.

Although the present invention has been described hereinabove by way of illustrative embodiments thereof, it can be modified at will within the scope of the appended claims, without departing from the spirit and nature of the subject invention.

What is claimed is:

1. A method for producing a quantity of a hot beverage, comprising:
   providing a source of a liquid having an adjustable temperature;
   selecting an infusion time and an infusion temperature;
   supplying from the source liquid substantially at the selected infusion temperature, said supplied liquid having a volume equal to or slightly larger than said quantity;
   mixing said supplied liquid with a flavour ingredient having the selected infusion time and infusion temperature;
   infusing said flavour ingredient in said supplied liquid substantially for said selected infusion time whereby said selected ingredient is at least partially dissipated in said supplied liquid thereby forming a brew; and
   following said infusion time, removing an undissipated portion of the flavour ingredient from said brew thereby yielding the beverage.

2. A method for producing a quantity of a hot beverage as defined in claim 1, wherein providing a source of a liquid comprises providing at least two sources of said liquid at respective, predetermined different temperatures.

3. A method for producing a quantity of a hot beverage as defined in claim 2 wherein supplying liquid substantially at the selected infusion temperature comprises combining liquid from said at least two sources.

4. A method for producing a quantity of a hot beverage as in claim 1 wherein the flavour ingredient has a corresponding serving temperature, said method further comprising warming the beverage to said serving temperature.

5. A method for producing a quantity of a hot beverage as in claim 2 comprising maintaining the liquid of one of said at least two sources slightly below boiling at a temperature of about 95° C., and maintaining the liquid of the other of said at least two sources at a temperature of about 50° C.

6. A method for producing a quantity of a hot beverage as in claim 1, comprising selecting a flavour ingredient from a plurality of different flavour ingredients, and selecting the infusion time and infusion temperature of said selected flavour ingredient.

7. A method for producing a quantity of a hot beverage as in claim 6, wherein said liquid is water and said plurality of different flavour ingredients comprises a variety of different tea leaves.

8. An apparatus for producing a quantity of a hot beverage comprising:
   a hot beverage production controller;
   a source of a liquid having an adjustable temperature connected to said controller;
   a selector of infusion time and infusion temperature connected to the controller;
   a valve system interposed between said source and an infusion chamber, said valve system being connected to and controlled by said controller to supply liquid substantially at the selected infusion temperature from said source to said infusion chamber;
   the infusion chamber for infusing a flavour ingredient with said liquid substantially at the selected infusion temperature substantially for the selected infusion time, wherein said infusion chamber has an outlet, said flavour ingredient has the selected infusion time and infusion temperature, and said flavour ingredient dissipates in said liquid thereby forming a brew;
   a dispensing circuit interposed between the outlet of the infusion chamber and a vessel, and connected to and controlled by said controller to discharge said brew into said vessel; and
   a mechanical filter disposed for removing an undissipated portion of the flavour ingredient from said brew prior to discharging it in the vessel.

9. An apparatus for producing a quantity of a hot beverage as in claim 8, wherein the controller comprises means for performing a flush cycle by:
   supplying hot liquid from said source to the infusion chamber through said valve system;
   transferring water from the infusion chamber to the vessel compartment through the dispensing circuit.

10. An apparatus for producing a quantity of a hot beverage as defined in claim 8, wherein:
    said source comprises at least two sources of said liquid at respective, predetermined different temperatures; and
    said valve system comprises at least two valves interposed between said at least two sources and the infusion chamber, said valve system being connected to and controlled by said controller to mix liquid from said at least two sources and thereby supply liquid substantially at the selected infusion temperature from said at least two sources to said infusion chamber.

11. An apparatus for producing a quantity of a hot beverage as in claim 8, wherein the selector comprises a plurality of push buttons.

12. An apparatus for producing a quantity of a hot beverage as in claim 8, wherein said filter comprises a filter basket fitting inside the infusion chamber.

13. An apparatus for producing a quantity of a hot beverage as in claim 8, wherein at least one of said sources comprises a reservoir and a thermostatic heating system.

14. An apparatus for producing a quantity of a hot beverage as in claim 8, wherein the dispensing circuit comprises:
    a warm-up chamber connected to the controller; and
    a first valve interposed between the infusion chamber and the warm-up chamber, said first valve being connected to and controlled by the controller to transfer the brew from the infusion chamber to the warm-up chamber in view of warming-up the brew prior to discharging said brew in the vessel.

15. An apparatus for producing a quantity of a hot beverage as in claim 8, further comprising a vessel detector connected to the controller, wherein the controller discharge the brew in the vessel through the dispensing circuit only when a vessel is detected by said vessel detector.

16. An apparatus for producing a quantity of a hot beverage as in claim 14, wherein:
    the warm-up chamber has an outlet; and
    the dispensing circuit further comprises a second valve connected to the output of the warm-up chamber and to the controller, whereby the warmed up brew is discharged from the warm-up chamber to the vessel through the second valve under the control of the controller.

17. An apparatus for producing a quantity of a hot beverage as in claim 16, further comprising a vessel compartment in which the vessel is placed, said compartment comprising a gate for closing said compartment.

18. An apparatus for producing a quantity of a hot beverage as in claim 17, wherein the controller comprises means for performing a flush cycle by:

supplying hot liquid from said source to the infusion chamber through said valve system;

transferring water from the infusion chamber to the warm-up chamber through the first valve; and transferring water from warm-up chamber to the vessel compartment through the second valve.

19. An apparatus for producing a quantity of a hot beverage as in claim 14, wherein the infusion chamber comprises an infusion chamber access door, and the infusion chamber and infusion chamber access door are pivotally mounted for easy access to said infusion chamber.

20. An apparatus for producing a quantity of a hot beverage as in claim 14, comprising an infusion chamber assembly comprising:

an infusion chamber for containing liquid;

a filter basket movably mounted in said infusion chamber between a first position in which the filter basket is immersed in the liquid and a second position in which the filter basket is located outside the liquid; and a first actuator connected to the controller and the filter basket, and which, in operation, is actuated by the controller between a first position corresponding to the first position of the filter basket and a second position corresponding to the second position of the filter basket.

21. An apparatus for producing a quantity of a hot beverage as in claim 20 wherein said infusion chamber is a combined infusion/warm-up chamber.

22. An apparatus for producing a quantity of a hot beverage as in claim 21, wherein the infusion/warm-up chamber is pivotally mounted and provided with a spout.

23. An apparatus for producing a quantity of a hot beverage as in claim 22 wherein the combined infusion/warm-up chamber assembly further comprises a second actuator connected to the controller and the infusion/warm-up chamber to pivot, under the control of the controller, the infusion/warm-up chamber to discharge the liquid from the infusion/warm-up chamber to the vessel through the spout.

* * * * *